United States Patent
Schoeneman et al.

(10) Patent No.: US 11,898,657 B2
(45) Date of Patent: *Feb. 13, 2024

(54) THERMAL MANAGEMENT SYSTEM FOR ELECTRIFIED VEHICLE

(71) Applicant: Ford Global Technologies, LLC, Dearborn, MI (US)

(72) Inventors: Christian Brent Schoeneman, Southgate, MI (US); Michael Joseph Giunta, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,111

(22) Filed: Sep. 30, 2022

(65) Prior Publication Data

US 2023/0021779 A1   Jan. 26, 2023

Related U.S. Application Data

(63) Continuation of application No. 16/573,307, filed on Sep. 17, 2019, now Pat. No. 11,506,306.

(51) Int. Cl.
*F16K 49/00* (2006.01)
*B60H 1/00* (2006.01)
*B60L 58/26* (2019.01)
*B60L 53/302* (2019.01)

(52) U.S. Cl.
CPC ....... *F16K 49/005* (2013.01); *B60H 1/00885* (2013.01); *B60L 53/302* (2019.02); *B60L 58/26* (2019.02)

(58) Field of Classification Search
CPC ...... F16K 49/005; B60L 53/302; B60L 58/26; B60H 1/00885
USPC ........................................................ 180/65.1
See application file for complete search history.

(56) References Cited

U.S. PATENT DOCUMENTS

| 7,841,431 | B2 |  | 11/2010 | Zhou |  |
|---|---|---|---|---|---|
| 9,481,477 | B2 |  | 11/2016 | Kjar |  |
| 10,573,940 | B2 | * | 2/2020 | Dunham | .............. H01M 10/617 |
| 11,338,647 | B1 | * | 5/2022 | Johnston | ............. B60H 1/00278 |
| 2008/0251235 | A1 | * | 10/2008 | Zhou | ........................ B60L 50/51 |
|  |  |  |  |  | 165/59 |

(Continued)

FOREIGN PATENT DOCUMENTS

| CA | 2736341 A1 * 12/2011 | ............... B60H 1/00 |
|---|---|---|
| CN | 103287252 B  *  3/2016 |  |

(Continued)

*Primary Examiner* — Suresh Memula
(74) *Attorney, Agent, or Firm* — David B. Kelley; Carlson, Gaskey & Olds, P.C.

(57) ABSTRACT

An exemplary thermal management system includes, among other things, a valve, a radiator loop configured to be connected to the valve, a power electronics loop configured to be connected to the valve, a heater loop configured to be connected to the valve, and a battery loop configured to be connected to the valve. The valve is configured to connect one or more of the radiator, power electronics, heater, and battery loops together and the valve is configured to isolate at least one of the radiator, power electronics, heater, and battery loops from any remaining loops of the radiator, power electronics, heater, and battery loops.

18 Claims, 8 Drawing Sheets

(56) References Cited

U.S. PATENT DOCUMENTS

| | | | |
|---|---|---|---|
| 2010/0025006 A1* | 2/2010 | Zhou | B60L 58/26 165/59 |
| 2012/0225341 A1* | 9/2012 | Major | B60L 3/003 429/120 |
| 2015/0200427 A1* | 7/2015 | Haskins | H01M 10/637 165/80.4 |
| 2016/0318370 A1* | 11/2016 | Rawlinson | B60H 1/32281 |
| 2016/0318409 A1* | 11/2016 | Rawlinson | B60L 1/003 |
| 2017/0152957 A1 | 6/2017 | Roche et al. | |
| 2018/0154734 A1* | 6/2018 | Lee | H01M 10/613 |
| 2018/0154782 A1* | 6/2018 | Lee | B60L 58/26 |
| 2018/0178615 A1 | 6/2018 | Xia et al. | |
| 2020/0062106 A1* | 2/2020 | Wong | B60L 58/27 |
| 2021/0242518 A1* | 8/2021 | Shrivastava | H01M 10/663 |
| 2021/0296964 A1* | 9/2021 | Sakamoto | H05K 7/20872 |
| 2021/0402843 A1* | 12/2021 | Moradnia | B60K 11/04 |
| 2021/0402869 A1* | 12/2021 | Favela Tentori | B60L 58/26 |
| 2022/0063368 A1* | 3/2022 | Miyamoto | H01M 10/6568 |
| 2022/0134839 A1* | 5/2022 | He | B60H 1/00485 165/203 |
| 2022/0194165 A1* | 6/2022 | Cohan | B60L 58/21 |

FOREIGN PATENT DOCUMENTS

| | | | | |
|---|---|---|---|---|
| CN | 111347939 B | * | 11/2021 | ......... H01M 10/425 |
| CN | 111354996 B | * | 3/2022 | ......... H01M 10/613 |
| CN | 114144323 A | * | 3/2022 | ......... B60H 1/00278 |
| CN | 114206651 A | * | 3/2022 | ......... B60H 1/00278 |
| CN | 114269587 A | * | 4/2022 | ............ B60K 11/02 |
| CN | 115230462 A | * | 10/2022 | |
| CN | 115257300 A | * | 11/2022 | |
| CN | 115257302 A | * | 11/2022 | |
| CN | 115257355 A | * | 11/2022 | |
| CN | 115320321 A | * | 11/2022 | |
| DE | 102019130543 B4 | * | 10/2021 | ......... B60H 1/00278 |
| EP | 3012133 A2 | * | 4/2016 | ......... B60H 1/00278 |
| EP | 3088230 A1 | * | 11/2016 | ......... B60H 1/00278 |
| WO | WO-2019166709 A1 | * | 9/2019 | ......... B60H 1/00392 |
| WO | WO-2020125684 A1 | * | 6/2020 | ......... B60H 1/00278 |
| WO | WO-2020129257 A1 | * | 6/2020 | ......... B60H 1/00278 |
| WO | WO-2021009309 A1 | * | 1/2021 | ......... B60H 1/00278 |

* cited by examiner

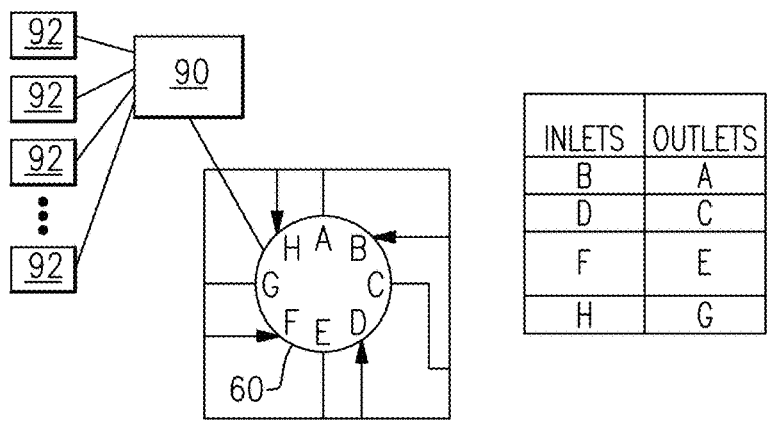
FIG.3
| VALVE STATE | | | | |
|---|---|---|---|---|
| 1 | D TO A | B TO C | F TO E | |
| 2 | D TO C | B TO A | F TO E | |
| 3 | F TO A | B TO C | D TO E | |
| 4 | B TO E | F TO G | H TO A | D TO C |
| 5 | B TO E | F TO C | H TO A | D TO G |
| 6 | D TO E | F TO C | B TO A | |
| 7 | D TO E | F TO C | B TO A | |
| 8 | F TO G AND C | H TO E | B TO A | D TO E |
| 9-10 | F TO G | H TO E | B TO A | D TO C |
FIG.4
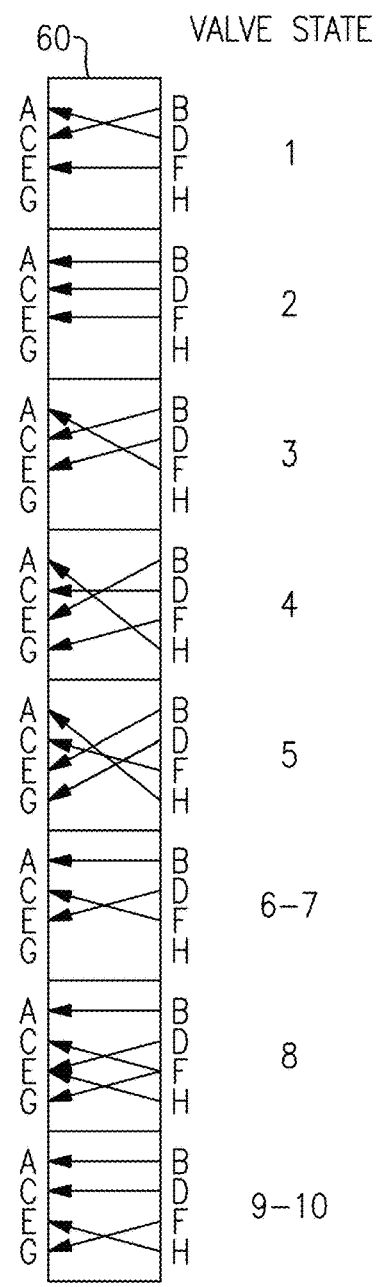
FIG.5

THERMAL MANAGEMENT SYSTEM FOR ELECTRIFIED VEHICLE

RELATED APPLICATION

This application is a continuation of U.S. application Ser. No. 16/573,307 filed on Sep. 17, 2019.

TECHNICAL FIELD

This disclosure relates to a thermal management system for an electrified vehicle.

BACKGROUND

An electrified vehicle includes a high voltage traction battery pack that powers electric machines and other electrical loads of the electrified vehicle. It is challenging to manage heat transfer between different groups of components in the electrified vehicle without the addition of costly heat exchangers and/or a plurality of valve systems.

SUMMARY

A thermal management system according to an exemplary aspect of the present disclosure includes, among other things, a valve, a radiator loop configured to be connected to the valve, a power electronics loop configured to be connected to the valve, a heater loop configured to be connected to the valve, and a battery loop configured to be connected to the valve. The valve is configured to connect one or more of the radiator, power electronics, heater, and battery loops together and the valve is configured to isolate at least one of the radiator, power electronics, heater, and battery loops from any remaining loops of the radiator, power electronics, heater, and battery loops.

In a further non-limiting embodiment of the foregoing system, the valve comprises the only valve in the thermal management system to transfer heat between the radiator, power electronics, heater, and battery loops.

In a further non-limiting embodiment of any of the foregoing systems, the radiator loop includes at least one low temperature radiator that is fluidly connected to the valve.

In a further non-limiting embodiment of any of the foregoing systems, the power electronics loop includes at least one electric machine and at least one motor driven pump that is fluidly connected to the valve.

In a further non-limiting embodiment of any of the foregoing systems, the heater loop includes at least one PTC heater, at least one heater core, and at least one motor driven pump that is fluidly connected to the valve.

In a further non-limiting embodiment of any of the foregoing systems, the battery loop includes at least one battery, at least one battery chiller, and at least one motor driven pump that is fluidly connected to the valve.

In a further non-limiting embodiment of any of the foregoing systems, the valve comprises a single valve that has only four inlets and only four outlets.

In a further non-limiting embodiment of any of the foregoing systems, a system controller controls the valve to manage heat transfer for a plurality of operational conditions that include at least a first operational condition where the battery and the heater loops are shared and the power electronics and radiator loops are isolated from the battery and the heater loops.

In a further non-limiting embodiment of any of the foregoing systems, a system controller controls the valve to manage heat transfer for a plurality of operational conditions that include at least a first operational condition where only the heater loop is active and the power electronics, radiator, and battery loops are isolated from the heater loop.

In a further non-limiting embodiment of any of the foregoing systems, a system controller controls the valve to manage heat transfer for a plurality of operational conditions that include at least a first operational condition where power electronics, battery, and heater loops are in series and the radiator loop is isolated from power electronics, battery, and heater loops.

In a further non-limiting embodiment of any of the foregoing systems, a system controller controls the valve to manage heat transfer for a plurality of operational conditions that include at least a first operational condition where the battery, power electronics, and radiator loops are shared and the heater loop is isolated from battery, power electronics, and radiator loops.

In a further non-limiting embodiment of any of the foregoing systems, a system controller controls the valve to manage heat transfer for a plurality of operational conditions that include at least a first operational condition where the battery, power electronics, heater, and radiator loops are shared.

In a further non-limiting embodiment of any of the foregoing systems, a system controller controls the valve to manage heat transfer for a plurality of operational conditions that include at least a first operational condition where the battery, power electronics, and heater loops are shared and the radiator loop is isolated from battery, power electronics, and heater loops.

In a further non-limiting embodiment of any of the foregoing systems, the valve is a single valve and a system controller controls the single valve to manage heat transfer for a plurality of operational conditions that include at least:
  a first operational condition where the battery and the heater loops are shared and the power electronics and radiator loops are isolated from the battery and the heater loops;
  a second operational condition where only the heater loop is active and the power electronics, radiator, and battery loops are isolated from the heater loop;
  a third operational condition where power electronics, battery and heater loops are in series and the radiator loop is isolated from power electronics, battery, and heater loops;
  a fourth operational condition where the battery, power electronics, and radiator loops are shared and the heater loop is isolated from battery, power electronics, and radiator loops;
  a fifth operational condition where the battery, power electronics, heater, and radiator loops are shared; and
  a sixth operational condition where the battery, power electronics, and heater loops are shared and the radiator loop is isolated from the battery, power electronics, and heater loops.

In a further non-limiting embodiment of any of the foregoing systems, the single valve has only four inlets and only four outlets, and wherein the four inlets comprise: a first inlet fluidly connected to a battery in the battery loop, a second inlet fluidly connected to a heater core in the heater loop, a third inlet fluidly connected to power electronics in the power electronics loop, and a fourth inlet fluidly connected to a radiator in the radiator loop; and wherein the four outlets comprise: a first outlet fluidly connected to a battery chiller in the battery loop, a second outlet fluidly connected to a PTC heater in the heater loop, a third outlet fluidly connected to the power electronics in the power electronics loop, and a fourth outlet fluidly connected to the radiator in the radiator loop.

In a further non-limiting embodiment of any of the foregoing systems, the radiator loop comprises a heat dissipater.

In a further non-limiting embodiment of any of the foregoing systems, a primary engine cooling circuit is in fluid communication with the heater loop.

In a further non-limiting embodiment of any of the foregoing systems, at least two of the radiator, power electronics, heater, and battery loops flow in series while the remaining of the radiator, power electronics, heater, and battery loops are isolated from each other.

In a further non-limiting embodiment of any of the foregoing systems, each of the radiator, power electronics, heater, and battery loops is in fluid communication with at least one other of the radiator, power electronics, heater, and battery loops such that none of the radiator, power electronics, heater, and battery loops are isolated from each other.

A method according to another exemplary aspect of the present disclosure includes, among other things, controlling a single valve to fluidly connect one or more of a radiator loop, a power electronics loop, a heater loop, and a battery loop together; and controlling the single valve to isolate one or more of the radiator, power electronics, heater, and battery loops from any remaining loops of the radiator, power electronics, heater, and battery loops, and wherein fluid connection and isolation of the radiator, power electronics, heater, and battery loops is determined based on a desired thermal operational condition for an electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a schematic illustration of the inlets and outlets from a valve of the thermal management system of FIG. 2.

FIG. 4 is a chart detailing the inlet to outlet connections for plurality of operational conditions.

FIG. 5 is a valve state configuration showing the inlet/outlet connections for each of the plurality of operational conditions.

DETAILED DESCRIPTION

This disclosure details a thermal management system for electrified vehicles. An exemplary thermal management system may utilize a single valve to connect one or more of radiator, power electronics, heater, and battery loops together and may also be configured to isolate at least one of the radiator, power electronics, heater, and battery loops from any remaining loops of the radiator, power electronics, heater, and battery loops.

Figure 1:
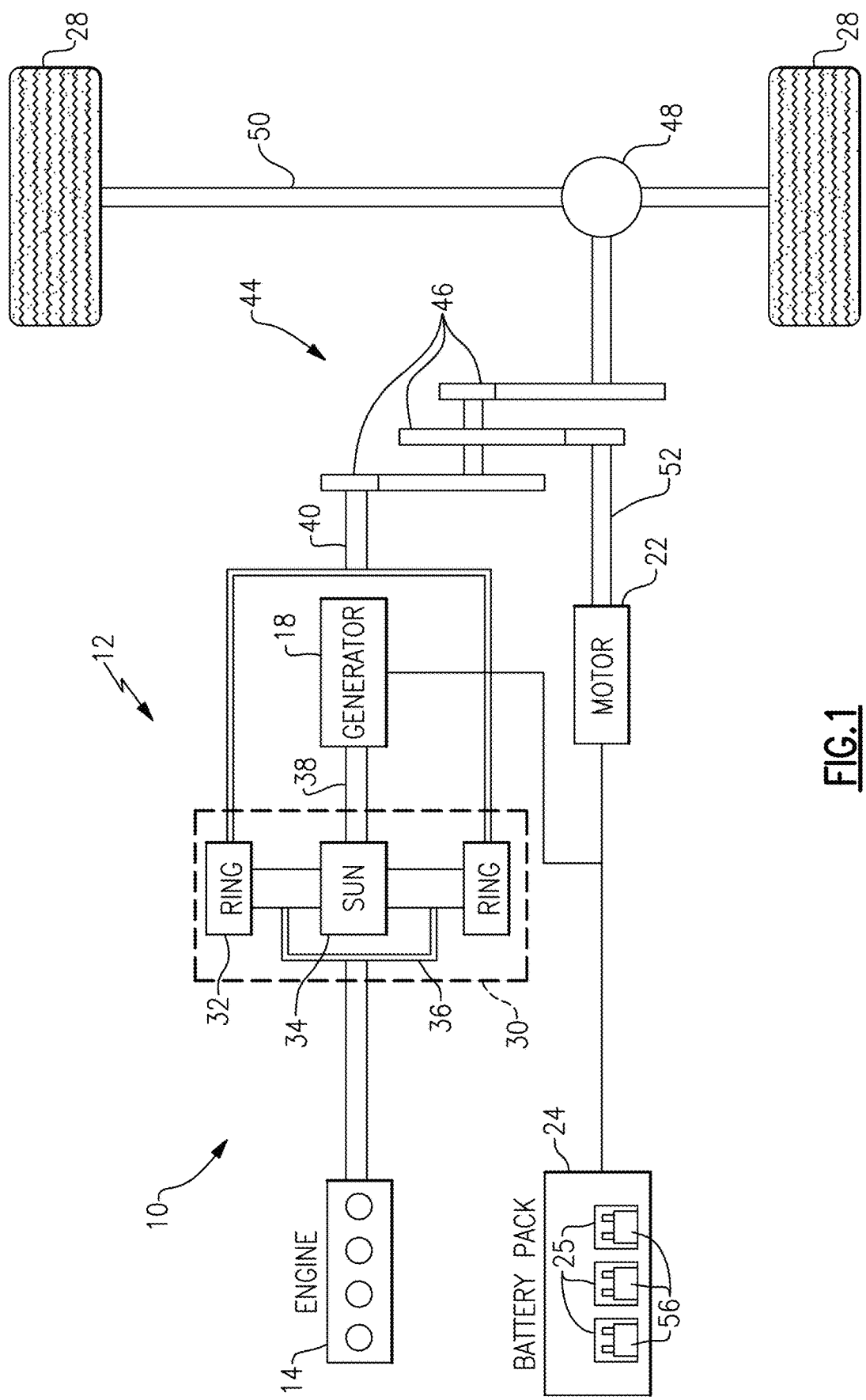
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells 56) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

During certain conditions, such as battery cell charging event, battery cell discharging events, hot ambient conditions, etc., a relatively significant amount of heat can be generated by the battery cells 56 of the battery pack 24. Other components of the electrified vehicle can also produce heat and/or require cooling dependent upon various vehicle operating conditions. It is desirable to manage this heating and cooling to improve the capacity and life of the battery cells 56 and therefore improve the efficiency of the battery pack 24, and well as reducing energy usage. Systems and techniques for actively and efficiently managing this heat are therefore detailed below.

Figure 2:
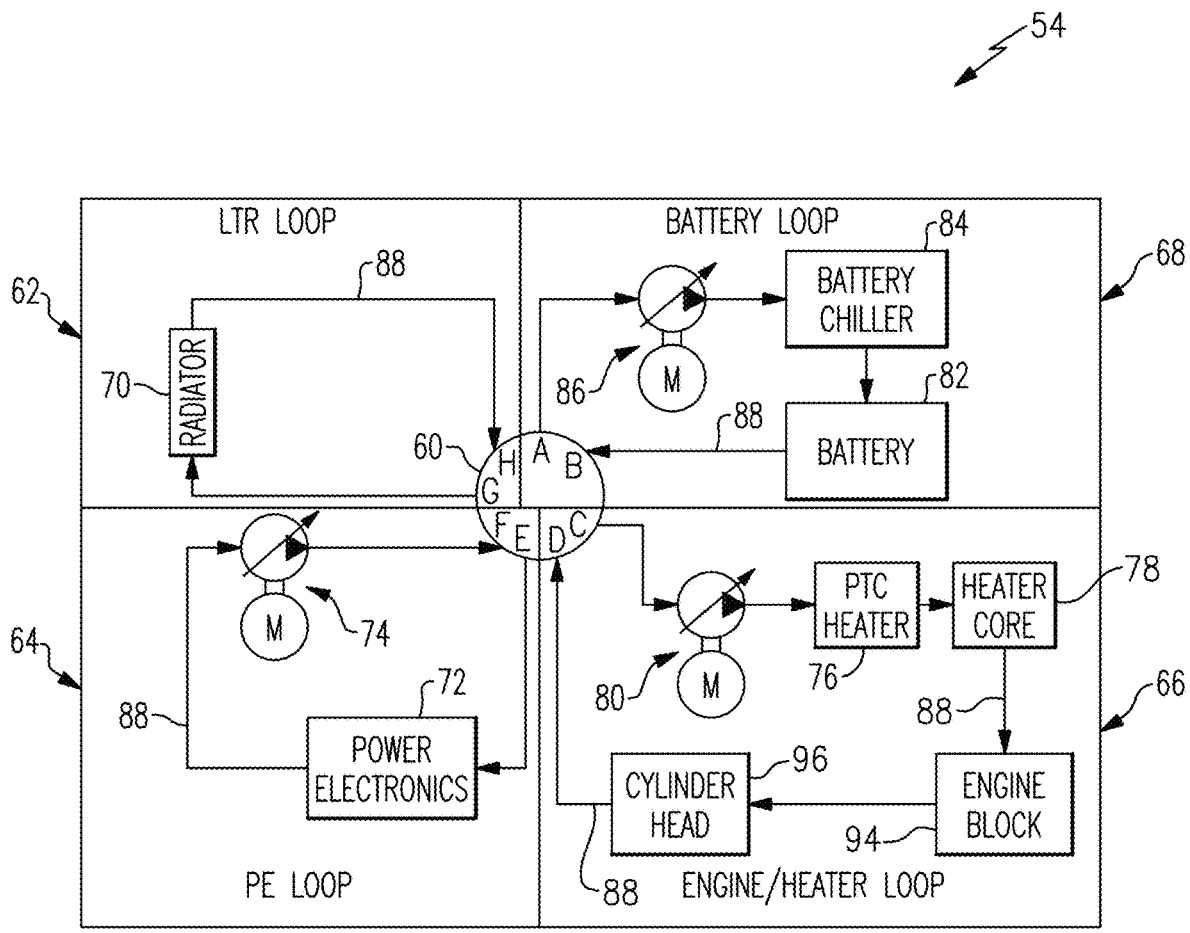
FIG. 2 illustrates a thermal management system for an electrified vehicle.

FIG. 2 schematically illustrates a thermal management system 54 with four circuit loops that can be incorporated into an electrified vehicle, such as the electrified vehicle 12 of FIG. 1. The thermal management system 54 may be controlled to manage the thermal load generated by various vehicle components, such as the battery pack 24 of the electrified vehicle 12, for example, as well as other components. Optionally, a primary engine cooling path for the engine 14 may also be added to the four exemplary circuit loops shown in FIG. 2.

In one example, the thermal management system 54 includes a single valve 60, a radiator loop 62 in fluid communication with the valve 60, a power electronics (PE) loop 64 in fluid communication with the valve 60, a heater loop 66 (optionally including a primary engine circuit) in fluid communication with the valve 60, and a battery loop 68 in fluid communication with the valve 60. In one example, the radiator loop 62 comprises a low temperature radiator loop that includes a radiator 70 that serves to release heat to the external atmosphere. In one example, the power electronics loop 64 includes power electronics 72, such as the electric machines that drive the wheels for example, and at least one variable speed motor driven pump 74 that is fluidly connected to the valve 60. In one example, the heater loop 66 comprises a passenger cabin/heater loop that includes a Positive Temperature Coefficient (PTC) heater 76, a heater core 78, and at least one variable speed motor driven pump 80 fluidly connected to the valve 60. In one example, PTC heaters are self-regulating heaters and use conductive inks printed on thin, flexible polymer-based substrates. In one example, the battery loop 68 comprises a battery/chiller loop and includes a battery pack 82, a battery chiller 84, and at least one variable speed motor driven pump 86 fluidly connected to the valve 60. Optionally, the battery chiller 84 may not be needed. The single valve 60 is configured to connect one or more of the radiator 62, power electronics 64, heater 66, and battery 68 loops together, and the single valve 60 is also configured to isolate at least one of the radiator 62, power electronics 64, heater 66, and battery 68 loops from any remaining loops of the radiator 62, power electronics 64, heater 66, and battery 68 loops.

The heater loop 66 may optionally include a primary engine cooling circuit as shown in FIG. 2. In one example, the outlet of the heater core 78 is connected to an inlet to an engine block 94 of the engine 14. The engine block 94 directs flow to a cylinder head 96 and the outlet of the cylinder heat 96 leads to the valve inlet D. In configurations that do not include the engine block 94 and cylinder head 96, the outlet from the heater core 78 goes directly to the valve inlet D (see FIGS. 6-15).

In an embodiment, the battery thermal management system 54 selectively communicates a coolant through the various loops to thermally manage the temperature of the various components within the loops. The coolant can be, for example, water mixed with ethylene glycol or any other suitable coolant. The coolant may be circulated through various internal cooling conduits 88 to control the temperature of the different components within the loops.

FIG. 3 shows a schematic representation of the valve 60 as used in the thermal management system 54 of FIG. 2. The valve 60 comprises the only valve 60 in the thermal management system 54 to transfer heat between the radiator 62, power electronics 64, heater 66, and battery 68 loops. In order to accomplish this, the valve 60 has only four outlets A, C, E, G and the valve 60 has only four inlets B, D, F, H as shown in FIG. 3. Outlet A fluidly connects to the motor driven pump 86 and battery chiller 84 of the battery loop 68. Outlet C fluidly connects to the motor driven pump 80 and PTC heater 76 of the heater loop 66. Outlet E fluidly connects to the PE 72 of the PE loop 64. Outlet G fluidly connects to the radiator 70 of the radiator loop 62. Inlet B fluidly connects to the outlet of the battery 82 of the battery loop 68. Inlet D fluidly connects to an outlet from the heater core 78 of the heater loop 66. Inlet F fluidly connects to an outlet of the motor driven pump 74 of the PE loop 64. Inlet H fluidly connects to the outlet of the radiator 70 from the radiator loop 62.

The valve 60 is controlled by a system controller 90 to control flow from the inlets and outlets amongst the various loops. The controller 90 receives data from various sensors 92, which can include temperature sensors, speed sensors, flow sensors, etc. for example. The system controller 90 controls the valve 60 in response to various vehicle operational conditions as will be explained below.

Each loop can be viewed as a heat generator or a heat dissipater and each loop has different minimum and maximum operating temperatures. For example, the low temperature radiator (LTR) loop 62 comprises a heat dissipater, the power electronics (PE) loop 64 comprises a heat generator having a maximum temperature of 70 degrees Celsius for example, the cabin/battery heater (HTR) loop 66 comprises a heat generator and heat dissipater that operate within a range of –40 degrees Celsius to 110 degrees Celsius for example, and the chiller/battery loop 68 comprises a heat generator and heat dissipater that operate within a range of 10 degrees Celsius to 50 degrees Celsius for example. These extreme temperature ranges of the components need thermal management to maintain the required temperatures through heat transfer between components. The four loops are connected or isolated based on functional requirements that include, for example, the following operational conditions: PE 64 dissipates heat through the LTR 62, PE 64 dissipates heat to the cabin, PE 64 dissipates heat to the battery 82, HTR 66 generates heat for the cabin, HTR 66 generates heat for the battery 82, HTR 66 dissipates heat from the battery 82, HTR 66 dissipates heat from the PE 64, battery 82 dissipates heat through the chiller 84, battery 82 dissipates heat through the HTR 66, and battery 82 dissipates heat through the LTR 62.

Figure 6:
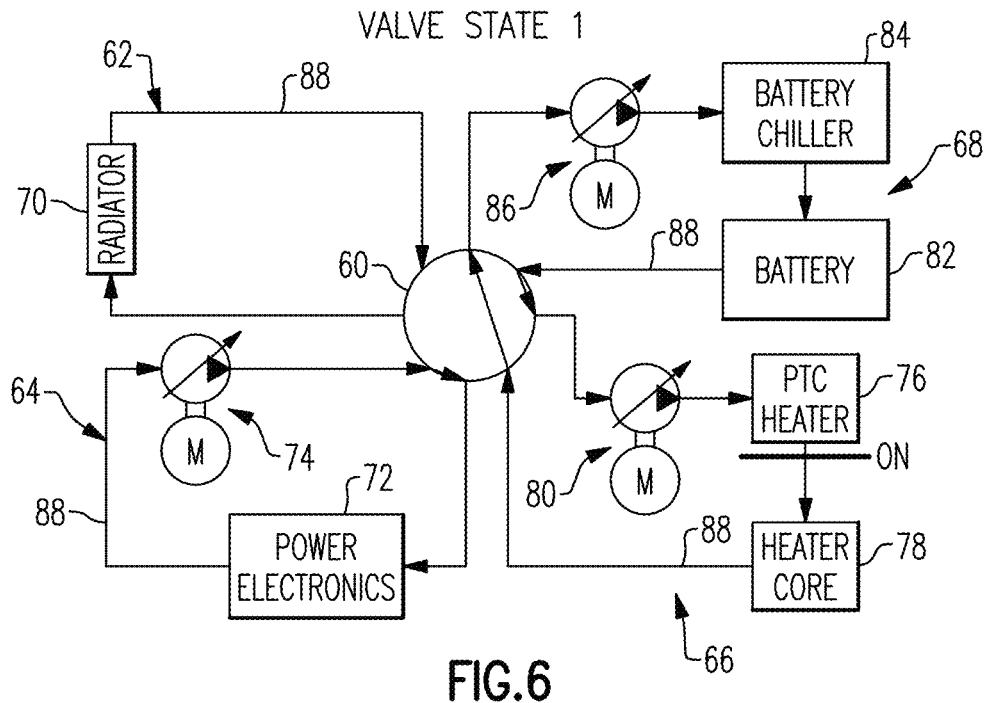
FIG. 6 is a schematic diagram of one operational condition.
Figure 7:
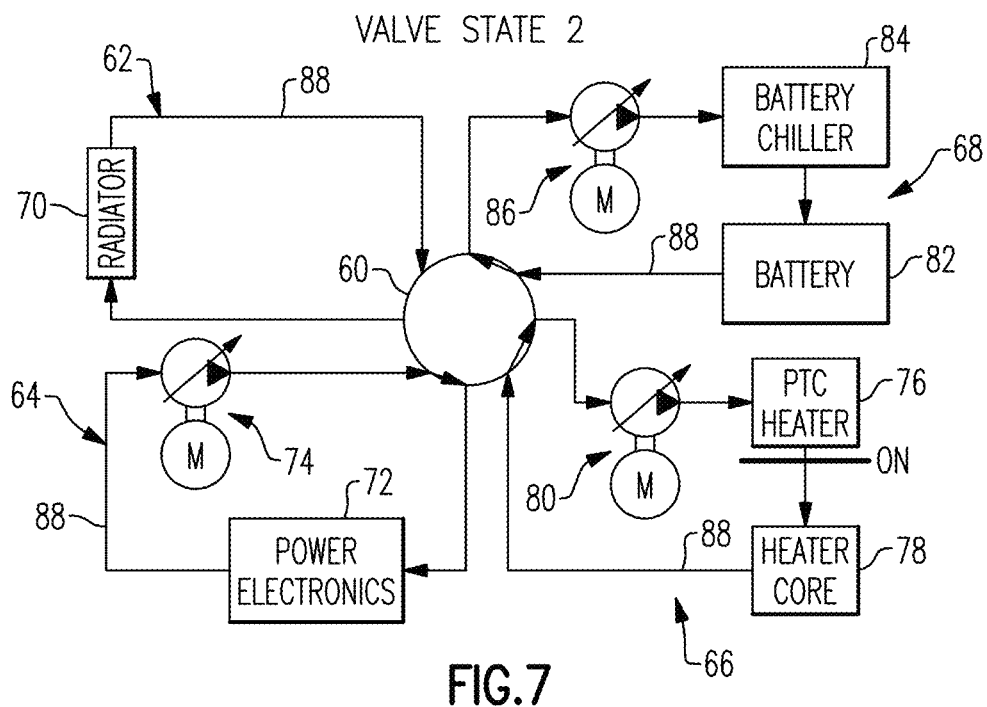
FIG. 7 is a schematic diagram of another operational condition.

FIGS. 6-14 show examples of different operating conditions. The valve states for each of these operating conditions is shown in FIGS. 4 and 5. In a first condition (Valve State 1—FIG. 6), the temperature is, for example, –20 degrees Celsius or below. In this first condition, the PE loop 64 and the radiator loop 62 are isolated, and the heater 66 and battery 68 loops flow in series as shown in FIG. 6. This provides battery heating only for the battery 82 and does not heat the PE 72. In this first condition, identified as "Valve State 1" in FIGS. 4-5, the inlet D receives fluid from the outlet of the heater core 78 and is connected to the outlet A which directs fluid into the battery loop 68. Additionally, inlet B receives fluid exiting the battery 82 and is connected to outlet C which directs fluid into the PTC heater 76 which is on. Further, while the PE loop 64 is isolated there may be flow through the PE loop 64 as inlet F receives flow exiting the pump 74 and directs flow via outlet E into the PE 72.

In a second condition identified as "Valve State 2" in FIGS. 4-5, the temperature is also, for example, –20 degrees Celsius or below. In this additional condition, the PE loop 64, radiator loop 62, heater loop 66, and battery loop 68 are isolated from each other. In one example, only the heater loop 66 has flow to provide rapid cabin heating and uses less energy to warm the cabin at a faster rate. In this condition "Valve State 2 (FIG. 7)", the inlet D of the valve 60 receives fluid from the outlet of the heater core 78 and is connected to the outlet C which directs fluid into the PTC heater 76. Optionally, or in additional to this heating loop flow, the PE loop 64 may also have flow as inlet F receives flow exiting the pump 74 and directs flow via outlet E into the PE 72.

Figure 8:
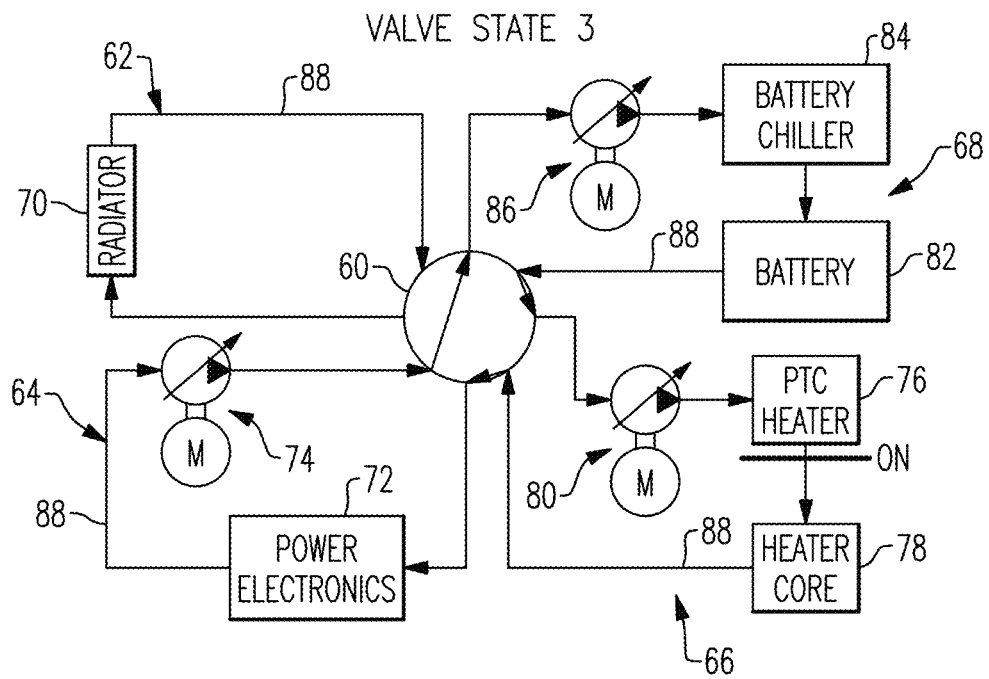
FIG. 8 is a schematic diagram of another operational condition.

In a third condition identified as "Valve State 3" in FIGS. 4-5, the temperature is also, for example, –20 degrees Celsius or below. In this second condition, there is no flow through the radiator loop 62, i.e. this loop 62 is isolated, and the PE loop 64, the heater loop 66, and battery loop 68 have flow as shown in FIG. 8. This provides battery heating and utilizes waste heat from the PE 72 to warm the battery 82. In this third condition "Valve State 3 (FIG. 8)", the inlet D of the valve 60 receives fluid from the outlet of the heater core 78 and is connected to the outlet E which directs fluid into the PE 72, the inlet B receives fluid from the outlet of the battery 82 and is connected to the outlet C which directs fluid into the PTC heater 76 which is on, and the inlet F receives fluid from the outlet of the PE 72 and is connected to outlet A that directs fluid into the battery chiller 84.

Figure 9:
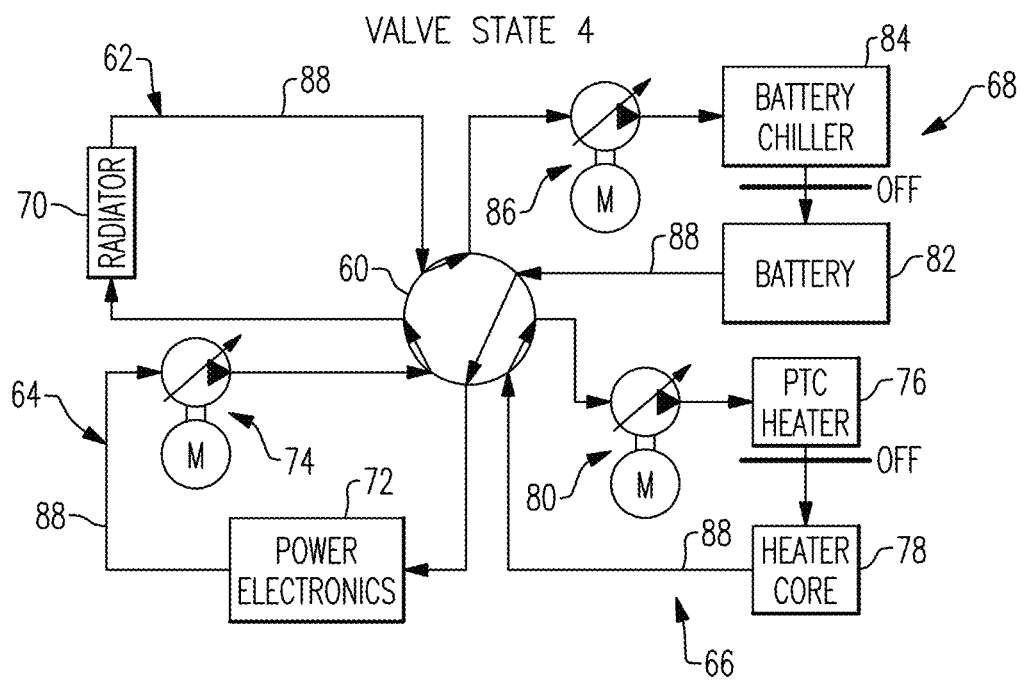
FIG. 9 is a schematic diagram of another operational condition.

In a fourth condition identified as "Valve State 4" in FIGS. 4-5, the temperature is, for example, in a range of –20 degrees Celsius to 25 degrees Celsius. In this fourth condition, there is no flow through the heater loop 66, i.e. this loop 66 is isolated, and the PE loop 64, the radiator loop 62, and battery loop 68 have flow as shown in FIG. 9. The PE 72 and battery 82 are on the LTR loop 62. This provides PE 72 and battery 82 cooling to ambient, and there is no use of the chiller 84, i.e. the chiller 84 is off. In this fourth condition "Valve State 4 (FIG. 9)", the inlet H of the valve 60 receives fluid from the outlet of the radiator 70 and is connected to the outlet A which directs fluid into the battery loop 68, the inlet B receives fluid from the outlet of the battery 82 and is connected to the outlet E which directs fluid into the PE 72, and the inlet F receives fluid from the outlet of the PE 72 and is connected to outlet G that directs fluid into the radiator 70.

Figure 10:
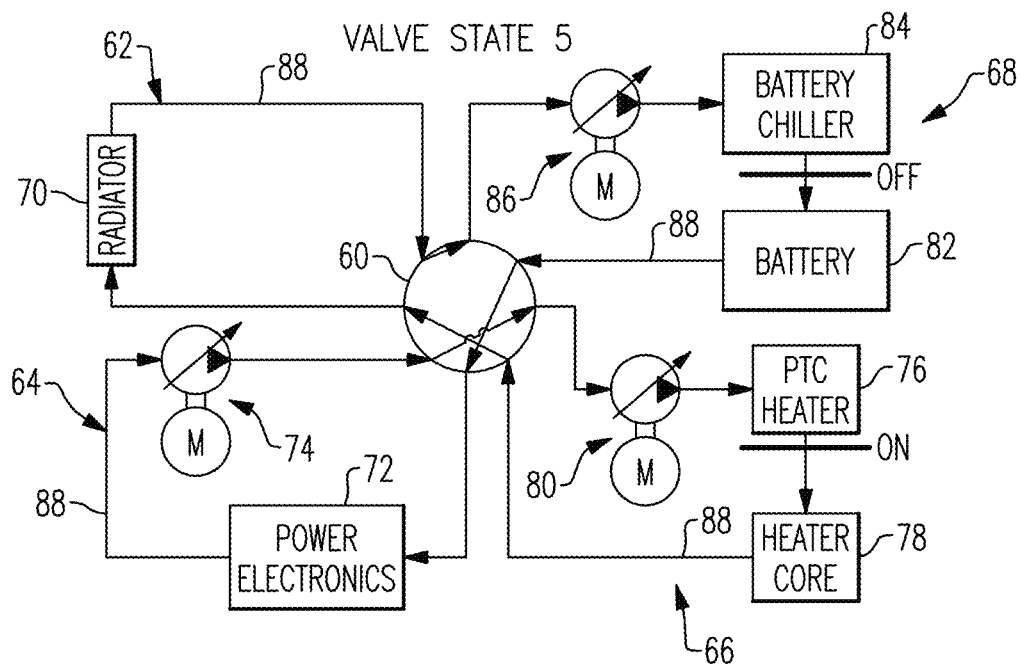
FIG. 10 is a schematic diagram of another operational condition.

In a fifth condition identified as "Valve State 5" in FIGS. 4-5, the temperature is, for example, in a range of –20 degrees Celsius to 25 degrees Celsius. In this fifth condition, the heater loop 66, PE loop 64, radiator loop 62, and battery loop 68 all have flow as shown in FIG. 10. The PE 72 and battery 82 are on the LTR loop 62 flow that is shared with the heater core 78 and the PTC heater 76 is off/on as needed. This provides PE and battery cooling to ambient, and waste heat is available to the heater core 78 with additional heat from the PTC heater 76. The chiller 84 is off and the PTC heater 76 is used to make up heat rejection if needed. In this fifth condition "Valve State 5 (FIG. 10)", the inlet H of the valve 60 receives fluid from the outlet of the radiator 70 and is connected to the outlet A which directs fluid into the battery loop 68, the inlet B receives fluid from the outlet of the battery 82 and is connected to the outlet E which directs fluid into the PE 72, the inlet F receives fluid from the outlet of the PE 72 and is connected to outlet C that directs fluid into the PTC heater 76.

Figure 11:
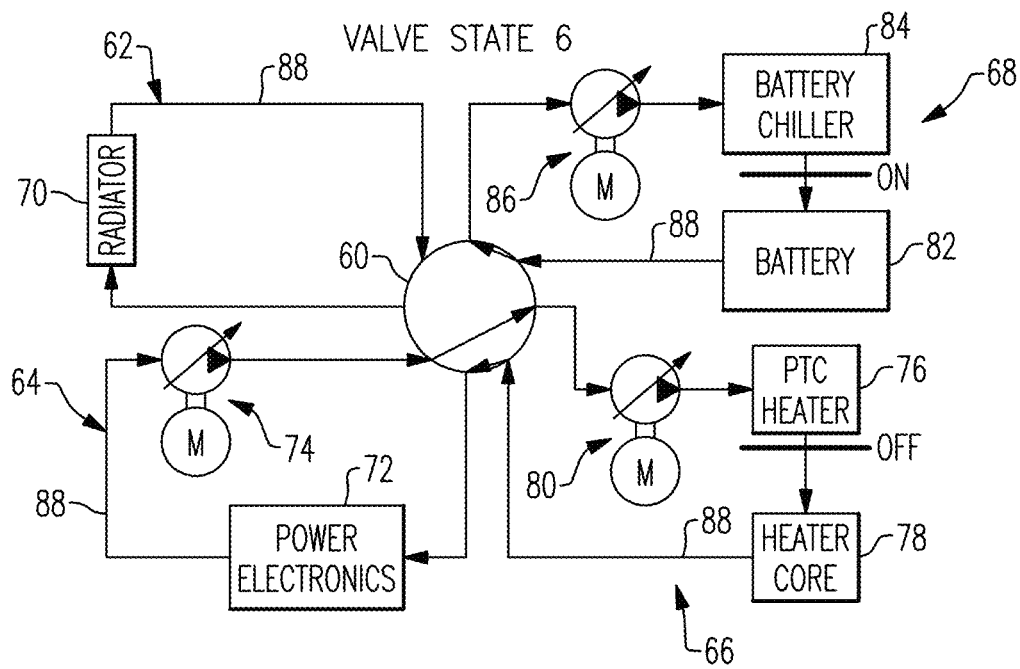
FIG. 11 is a schematic diagram of another operational condition.

In a sixth condition identified as "Valve State 6" in FIGS. 4-5, the temperature is, for example, in a range of –20 degrees Celsius to 25 degrees Celsius. In this sixth condition, there is no flow through the radiator loop 62, i.e. this loop 62 is isolated, and the PE loop 64, the heater loop 66, and battery loop 68 have flow as shown in FIG. 11. The battery 82 is on the chiller 84, and the PE 72 and heater 78 are in series while the PTC heater 76 is off. The battery 82 is cooled by the chiller 84 when the load/ambient temperature is too high, and the PE waste heat is for the heater core 78 without PTC heater usage. Thus, the battery 82 is chilled while utilizing waste heat from the PE loop 64. In this sixth condition "Valve State 6 (FIG. 11)", the inlet D of the valve 60 receives fluid from the outlet of the heater core 78 and is connected to the outlet E which directs fluid into the PE 72, the inlet B receives fluid from the outlet of the battery 82 and is connected to the outlet A which directs fluid into the battery chiller 84, and the inlet F receives fluid from the outlet of the PE 72 and is connected to outlet C that directs fluid into the heater loop 66.

Figure 12:
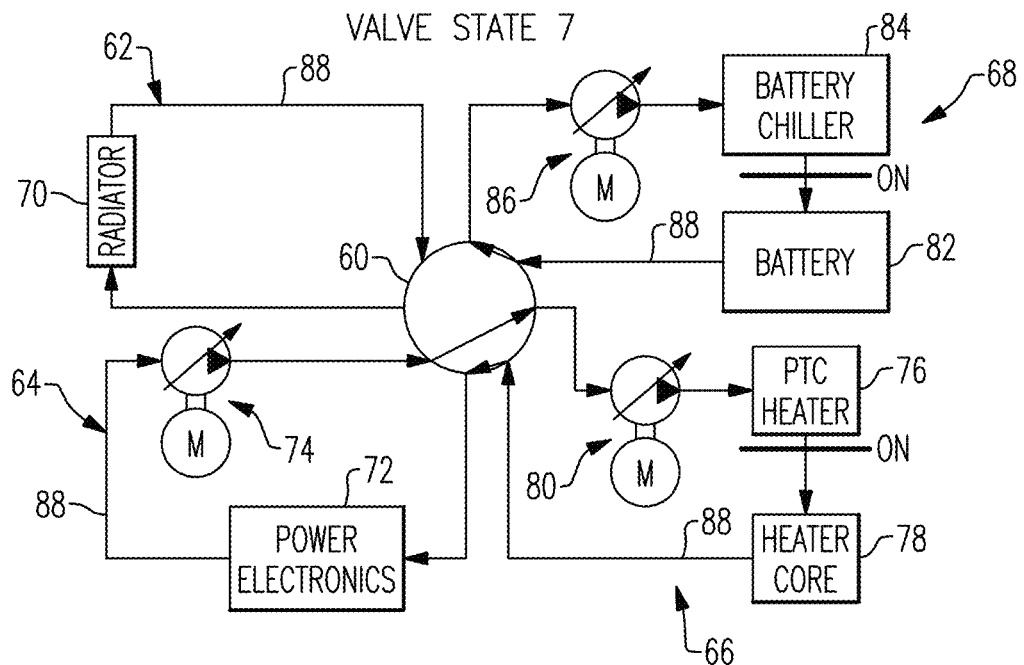
FIG. 12 is a schematic diagram of another operational condition.

In a seventh condition identified as "Valve State 7" in FIGS. 4-5, the temperature is, for example, in a range of −20 degrees Celsius to 25 degrees Celsius. In this seventh condition, there is no flow through the radiator loop 62, i.e. this loop 62 is isolated, and the PE loop 64, the heater loop 66, and battery loop 68 have flow as shown in FIG. 12. The battery 82 is on the chiller 84, and the PE 72 and heater 78 are in series while the PTC heater 76 is on. The battery 82 is cooled by the chiller 84 when the load/ambient temperature is too high, and the PE waste heat is for the heater core 78 with reducing PTC heater usage. Thus, the battery 82 is chilled while minimizing PTC heater usage. In this seventh condition "Valve State 7 (FIG. 12)", the inlet D of the valve 60 receives fluid from the outlet of the heater core 78 and is connected to the outlet E which directs fluid into the PE 72, the inlet B receives fluid from the outlet of the battery 82 and is connected to the outlet A which directs fluid into the battery chiller 84, and the inlet F receives fluid from the outlet of the PE 72 and is connected to outlet C that directs fluid into the heater loop 66.

Figure 13:
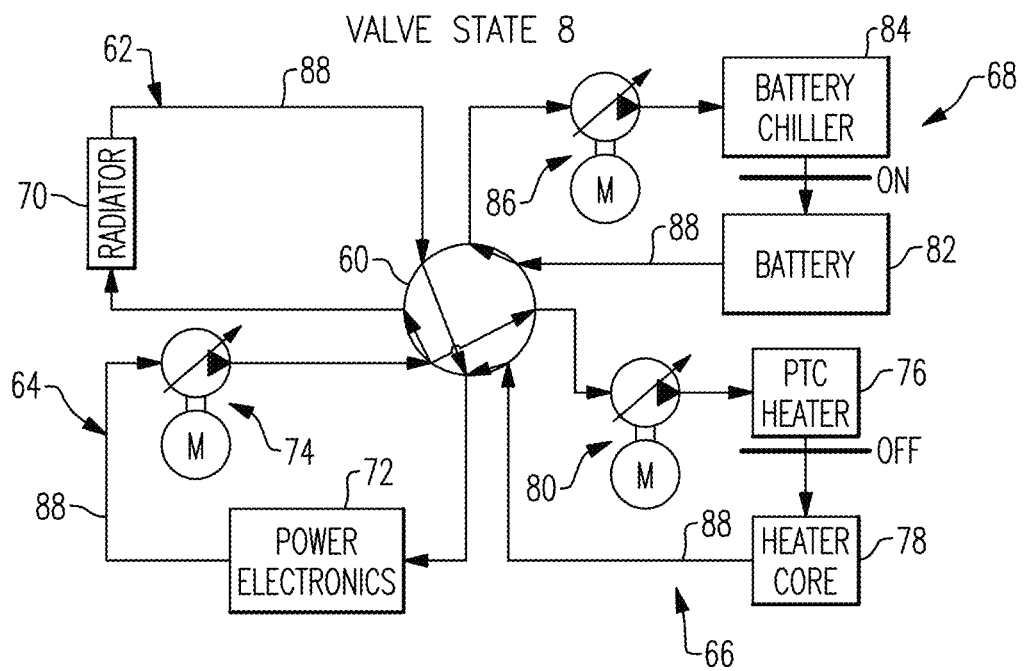
FIG. 13 is a schematic diagram of another operational condition.

In an eighth condition identified as "Valve State 8" in FIGS. 4-5, the temperature is, for example, in a range of 25 degrees Celsius to 30 degrees Celsius. In this eighth condition, the heater loop 66, PE loop 64, radiator loop 62, and battery loop 68 all have flow as shown in FIG. 13. The battery 82 is on chiller, PE flow is shared with the heater core 78, and the PTC heater 76 is off. This provides cabin reheat without the use of the PTC heater 76. In this eighth condition "Valve State 8 (FIG. 13)", the inlet F of the valve 60 receives fluid from the outlet of the PE loop and is connected to the outlet G which directs fluid into the radiator and is connected to outlet C which directs fluid into the heater loop 66, the inlet B receives fluid from the outlet of the battery 82 and is connected to the outlet A which directs fluid into the battery loop 68, the inlet H receives fluid from the outlet of the radiator 70 and is connected to outlet E that directs fluid into the PE 72, and the inlet D receives fluid from the heater loop 66 and is connected to outlet E that directs fluid into the PE loop 64.

Figure 14:
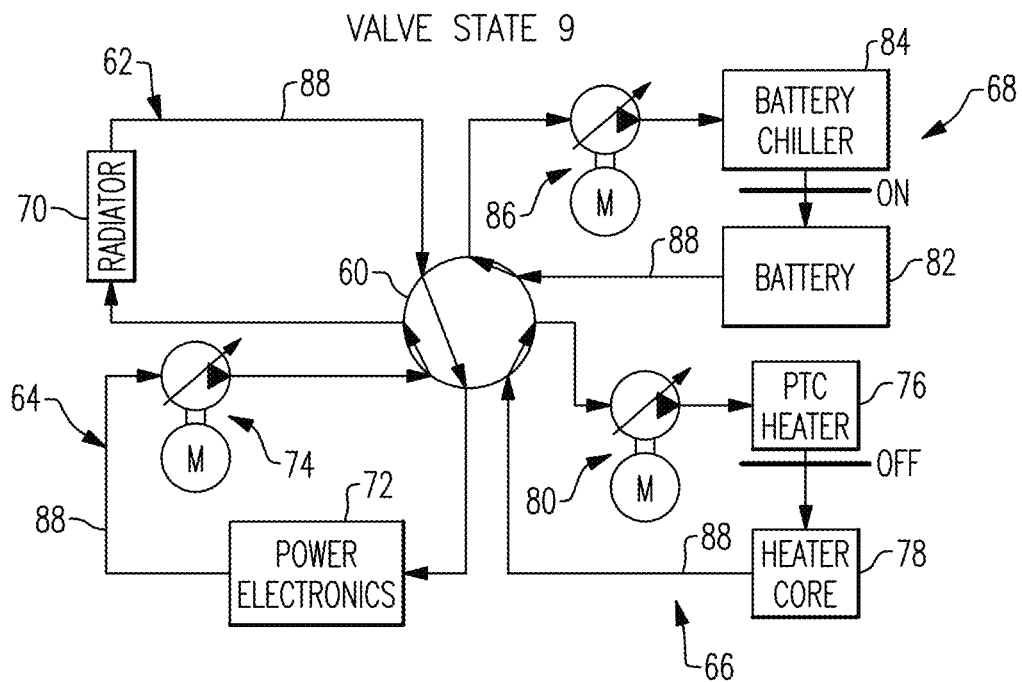
FIG. 14 is a schematic diagram of another operational condition.

In a ninth condition identified as "Valve State 9" in FIGS. 4-5, the temperature is, for example, in a range of 25 degrees Celsius to 30 degrees Celsius. In this ninth condition, the heater loop 66 and the battery loop 68 are isolated, and the PE loop 64 and the radiator loop 62 flow in series as shown in FIG. 14. The battery 82 is on chiller, the PE 72 is on the LTR loop 62, and the heater is off. The battery 82 is thus cooled by the chiller 84 in an isolated loop and the PE loop 64 is cooled by the radiator loop 62. This keeps components under maximum inlet temperature requirements. In this ninth condition "Valve State 9 (FIG. 14)", the inlet H of the valve 60 receives fluid from the outlet of the radiator 70 and is connected to the outlet E which directs fluid into the PE loop 64, the inlet B receives fluid from the outlet of the battery 82 and is connected to the outlet A which directs fluid into the battery loop 84, and the inlet F receives fluid from the outlet of the PE 72 and is connected to outlet G that directs fluid into the radiator 70. There also may be flow through the isolated heater loop 66 as the inlet D receives flow exiting the heater core 88 and directs flow to outlet C which is connected to an inlet to the pump 80 and PTC heater 76.

Figure 15:
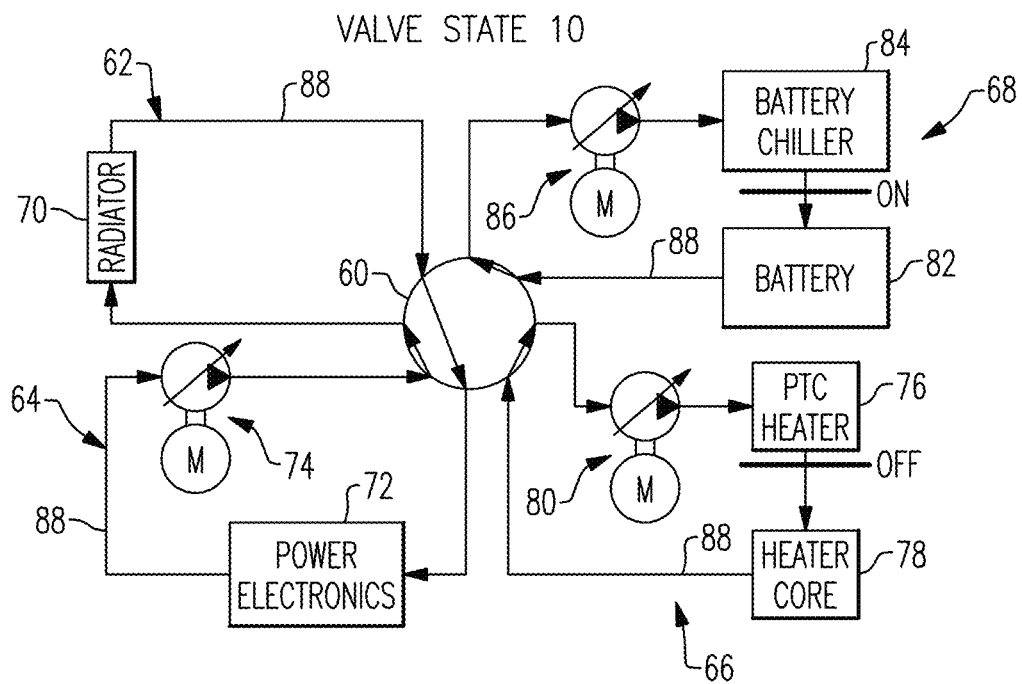
FIG. 15 is a schematic diagram of another operational condition.

In a tenth condition identified as "Valve State 10" in FIGS. 4-5, the temperature is, for example, in a range of 30 degrees Celsius to 50 degrees Celsius. In this tenth condition, the heater loop 66 and the battery loop 68 are isolated, and the PE loop 64 and the radiator loop 62 flow in series as shown in FIG. 15. The battery 82 is on chiller, the PE 72 is on the LTR loop 62, and the heater is off. The battery 82 is thus cooled by the chiller 84 in an isolated loop and the PE loop 64 is cooled by the radiator loop 62. In this tenth condition "Valve State 10 (FIG. 15)", the inlet H of the valve 60 receives fluid from the outlet of the radiator 70 and is connected to the outlet E which directs fluid into the PE loop 64, the inlet B receives fluid from the outlet of the battery 82 and is connected to the outlet A which directs fluid into the battery loop 84, and the inlet F receives fluid from the outlet of the PE 72 and is connected to outlet G that directs fluid into the radiator 70. There also may be flow through the isolated heater loop 66 as the inlet D receives flow exiting the heater core 88 and directs flow to outlet C which is connected to an inlet to the pump 80 and PTC heater 76.

Thus, the disclosed thermal management system 54 provides a method of controlling a single valve 60 to fluidly connect one or more of the radiator loop 62, PE loop 64, heater loop 66, and battery loop 68 together, while also be able to control the single valve 60 to isolate one or more of the radiator 62, power electronics 64, heater 66, and battery 68 loops from any remaining loops of the radiator 62, power electronics 64, heater 66, and battery 68 loops. The fluid connection and isolation of the radiator 62, power electronics 64, heater 66, and battery 68 loops is determined based on a desired thermal operational condition for the electrified vehicle.

The subject disclosure provides thermal management of electrified powertrains by using hydraulic circuit manipulation. By separating components of similar operating temperatures, as well as allowing each group of components to transfer heat between other groups, substantial thermal efficiencies are gained. A single hydraulic valve 60 is configured to deliver heat transfer under various vehicle conditions for four different loops as described above. The valve 60 allows these loops to connect to each other, allows multiple loops to be connected, and allows multiple loops to be isolated. By allowing these loops to be connected and isolated under various vehicle conditions, the energy usage of the vehicle can be reduced while also minimizing the required hardware.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal management system comprising:
   a valve;
   at least four different thermal loops controlled via the valve, wherein the valve comprises the only valve to fluidly connect one or more of the at least four different thermal loops; and
   a system controller configured to control the valve to manage thermal conditions in each of the at least four different thermal loops by connecting one or more of the four different thermal loops together and/or by isolating at least one loop of the four different thermal loops from any remaining loops of the four different thermal loops.

2. The system according to claim 1, wherein the valve has only four inlets and only four outlets.

3. The system according to claim 1, wherein a coolant that is communicated through the at least four different thermal loops comprises a glycol based coolant.

4. A thermal management system comprising:
   a valve;
   at least four different thermal loops controlled via the valve, wherein the at least four different thermal loops comprise at least
   a radiator loop,
   a power electronics loop,
   a heater loop configured, and
   a battery loop; and
   a system controller configured to control the valve to manage thermal conditions in each of the at least four different thermal loops by connecting one or more of the four different thermal loops together and/or by isolating at least one loop of the four different thermal loops from any remaining loops of the four different thermal loops.

5. The system according to claim 4, wherein the valve is configured to connect one or more of the radiator loop, power electronics loop, heater loop, and battery loop together in one of a plurality of operational conditions, and wherein the valve is configured to isolate at least one of the radiator loop, power electronics loop, heater loop, and battery loop from any remaining loops of the radiator loop, power electronics loop, heater loop, and battery loop in another of the plurality of operational conditions.

6. The system according to claim 5, wherein the radiator loop includes at least one radiator.

7. The system according to claim 5, wherein the power electronics loop includes at least one power electronic component.

8. The system according to claim 5, wherein the heater loop includes at least one PTC heater and at least one heater core.

9. The system according to claim 8, wherein the PTC heater comprises a single PTC heater within the heater loop.

10. The system according to claim 5, wherein the battery loop includes at least one battery and at least one battery chiller.

11. The system according to claim 4, wherein the radiator loop includes at least one radiator, the power electronics loop includes at least one power electronic component, the heater loop includes at least one PTC heater and at least one heater core, and the battery loop includes at least one battery and at least one battery chiller.

12. The system according to claim 11, wherein the system controller controls the valve in response to a plurality of operational conditions that include one or more of the following:
   a first operational condition where the battery loop and the heater loop are shared and the power electronics loop and radiator loop are isolated from the battery loop and the heater loop;
   a second operational condition where only the heater loop is active and the power electronics loop, radiator loop, and battery loop are isolated from the heater loop;
   a third operational condition where power electronics loop, battery loop, and heater loop are in series and the radiator loop is isolated from power electronics loop, battery loop, and heater loop;
   a fourth operational condition where the battery loop, power electronics loop, and radiator loop are shared and the heater loop is isolated from battery loop, power electronics loop, and radiator loops loop;
   a fifth operational condition where the battery loop, power electronics loop, heater loop, and radiator loop are shared;
   a sixth operational condition where the battery loop, power electronics loop, and heater loop are shared and the radiator loop is isolated from battery loop, power electronics loop, and heater loop.

13. The system according to claim 12, wherein the valve comprises the only valve to fluidly connect one or more of the radiator loop, power electronics loop, heater loop, and battery loop, and wherein the valve has only four inlets and only four outlets, and wherein the four inlets comprise:
   a first inlet fluidly connected to the at least one battery in the battery loop,
   a second inlet fluidly connected to the at least one heater core in the heater loop,
   a third inlet fluidly connected to the at least one power electronic component in the power electronics loop, and
   a fourth inlet fluidly connected to the at least one radiator in the radiator loop; and
   wherein the four outlets comprise:
   a first outlet fluidly connected to the at least one battery chiller in the battery loop,
   a second outlet fluidly connected to the at least one PTC heater in the heater loop,
   a third outlet fluidly connected to the at least one power electronic component in the power electronics loop, and
   a fourth outlet fluidly connected to the at least one radiator in the radiator loop.

14. A method comprising:
   providing a valve to fluidly connect to at least four different thermal loops, wherein the valve comprises the only valve that connects one or more of the at least four different thermal loops; and
   managing thermal conditions in each of the at least four different thermal loops by controlling the valve to connect one or more of the four different thermal loops together, and/or to isolate at least one loop of the four different thermal loops from any remaining loops of the at least four different thermal loops.

15. The method according to claim 14, wherein the valve has only four inlets and only four outlets.

16. The method according to claim 14, including fluidly communicating a coolant through the at least four different thermal loops, wherein the coolant comprises a glycol based coolant.

17. A method comprising:
   providing a valve to fluidly connect to at least four different thermal loops, wherein the at least four different thermal loops comprise at least a radiator loop, a power electronics loop, a heater loop configured, and a battery loop, and wherein the radiator loop includes at least one radiator, the power electronics loop includes at least one power electronic component, the heater loop includes at least one PTC heater and at least one heater core, and the battery loop includes at least one battery and at least one battery chiller; and managing thermal conditions in each of the at least four different thermal loops by controlling the valve to connect one or more of the four different thermal loops together, and/or to isolate at least one loop of the four different thermal loops from any remaining loops of the at least four different thermal loops.

18. The method according to claim 17, wherein including controlling the valve in response to a plurality of operational conditions that include one or more of the following:

a first operational condition where the battery loop and the heater loop are shared and the power electronics loop and radiator loop are isolated from the battery loop and the heater loop;

a second operational condition where only the heater loop is active and the power electronics loop, radiator loop, and battery loop are isolated from the heater loop;

a third operational condition where power electronics loop, battery loop, and heater loop are in series and the radiator loop is isolated from power electronics loop, battery loop, and heater loop;

a fourth operational condition where the battery loop, power electronics loop, and radiator loop are shared and the heater loop is isolated from battery loop, power electronics loop, and radiator loops loop;

a fifth operational condition where the battery loop, power electronics loop, heater loop, and radiator loop are shared;

a sixth operational condition where the battery loop, power electronics loop, and heater loop are shared and the radiator loop is isolated from battery loop, power electronics loop, and heater loop.

* * * * *